United States Patent

Schoch

[11] Patent Number: 6,114,965
[45] Date of Patent: Sep. 5, 2000

[54] SYSTEM FOR MONITORING THE DYNAMIC TOOLING/SHUTHEIGHT DEFLECTION ACTIVITY WITHIN A PRESS MACHINE

[75] Inventor: Daniel A. Schoch, Minster, Ohio

[73] Assignee: The Minster Machine Company, Minster, Ohio

[21] Appl. No.: 09/048,388

[22] Filed: Mar. 26, 1998

[51] Int. Cl.$^7$ ................................................... G08B 21/00
[52] U.S. Cl. ........................ 340/680; 340/679; 340/683; 73/570; 73/862.06
[58] Field of Search ..................... 340/680, 679, 340/683; 73/654, 570, 862.06, 862.41; 100/99; 364/474.17, 474.16

[56] References Cited

U.S. PATENT DOCUMENTS

| | | |
|---|---|---|
| 3,930,248 | 12/1975 | Keller . |
| 4,023,044 | 5/1977 | Miller et al. ............................. 340/680 |
| 4,116,050 | 9/1978 | Tanahashi et al. . |
| 4,274,282 | 6/1981 | Budraitis et al. . |
| 4,367,655 | 1/1983 | Bluml et al. . |
| 4,429,627 | 2/1984 | Edso . |
| 4,453,421 | 6/1984 | Umano . |
| 4,559,600 | 12/1985 | Rao ........................................ 340/680 |
| 4,633,720 | 1/1987 | Dybel et al. . |
| 4,636,780 | 1/1987 | Thomas et al. .......................... 340/683 |
| 4,656,898 | 4/1987 | Azuma et al. ........................... 340/680 |
| 4,766,758 | 8/1988 | Lucas et al. . |
| 4,980,844 | 12/1990 | Demjanenko et al. ................. 364/550 |
| 5,094,107 | 3/1992 | Schoch . |
| 5,170,358 | 12/1992 | Delio ................................... 364/474.19 |
| 5,423,199 | 6/1995 | Mangrulkar . |
| 5,440,499 | 8/1995 | Rasmussen . |
| 5,491,647 | 2/1996 | O'Brien et al. . |
| 5,579,232 | 11/1996 | Tong et al. ............................. 340/683 |
| 5,814,733 | 9/1998 | Khoury et al. ............................ 73/658 |

*Primary Examiner*—Jeffery A. Hofsass
*Assistant Examiner*—Anh La
*Attorney, Agent, or Firm*—Randall J. Knuth

[57] ABSTRACT

A method and apparatus for dynamically monitoring in real-time the operation of a press machine and tooling during actual production operations, in order to evaluate the true interaction between actual vibration activity occurring at multiple locations within the press machine geometry. A configuration of accelerometers is used to acquire measurement data indicating the acceleration of the press machine and for tooling at a plurality of press machine locations. An integrator converts the acceleration data into displacement data representing the displacement activity of the press machine at the indicated machine locations. Filtering the displacement data provides deflection measurements representing the vibrational activity occurring at the relevant machine and tooling location. Measurements of the relative press motion activity between selected machine locations provide an indication of the influence that deflection activity occurring at respective press machine locations has on one another.

51 Claims, 5 Drawing Sheets

SYSTEM FOR MONITORING THE DYNAMIC TOOLING/SHUTHEIGHT DEFLECTION ACTIVITY WITHIN A PRESS MACHINE

BACKGROUND OF THE INVENTION

1. Field of the Invention

The present invention generally relates to measurement systems for use with press machines, and, more particularly, to method and apparatus for dynamically monitoring the operation of a press machine during workpiece production cycles to identify and evaluate the press and tooling dynamic deflection activity.

2. Description of the Related Art

A press machine applies a force to a workpiece so that the material acquires a desired formation as the die configuration is maneuvered into contact with the material in response to the applied force. Various press types perform manufacturing processes such as forming, punching, mold closing, compressing, bending, drawing or injection molding. Systems for monitoring the press operation serve a critical role in production applications by measuring certain performance parameters that indicate the stability and optimization of the operation. Conventional arrangements employ a series of sensors affixed to the press machine at certain locations to measure the load being developed within the major components of the press machine. The load measurements are evaluated against certain threshold levels to determine whether current load conditions exceed the tonnage capacity. Another approach recognizes that loads developed in the press machine could lead to alterations in the structural integrity of press components such as the upright support members. An array of stress-strain gauges affixed to selected areas of the press machine provide measurements indicating the load levels existing in these areas.

One aspect of press operation warranting special attention involves accurately measuring and identifying the vibration activity developed within the press structure. U.S. Pat. No. 5,094,107 describes a variety of dynamic influences contributing to the generation and severity of press vibrations. Of particular note is the fact that vibrational activity can influence the production activity at neighboring die stations because of its ability to be transmitted through the press structure, in a manner not unlike the characteristic propagation of a shock wave from its epicenter. It is therefore critical to provide a monitoring system capable of accurately measuring the vibrational activity.

The normal load testing apparatus used in conjunction with these conventional monitoring systems has typically taken the form of static press loading and dynamic press loading. Neither configuration, however, serves as a demonstration of how the press machine and tooling will truly perform under actual loading conditions. These load calibration mechanisms, essentially function as models from which predictions are made of the actual performance data based on simulations constructed from the results of calibration. Static press loading involves subjecting the press assembly to one or two known hydraulic cylinder loads under static (i.e., non-motion) conditions to derive standard deflection values only applicable for making a general static comparison of one press versus another. Dynamic press loading via load cells distinguishes over static test apparatus because this method supplies measurement data on a dynamic basis; however, the loading mechanism still only represents a semisimulation of actual die loading conditions. Load cells are normally installed in the press machine to measure the responsivity of the press to certain known test loads, representing only a simulation of the load conditions that would actually occur in the event that production-type die configurations were used in an actual parts process. Operating the press machine with the load cell in place allows data to be continuously acquired from which a simulation model can be constructed and used to predict the dynamic performance under die load conditions. These conventional systems, however, evidence no ability to furnish measurement data on a continuous basis relating to the actual vibrational motion occurring within the press machine during an actual manufacturing processing when the die stations are in use.

SUMMARY OF THE INVENTION

The invention comprises, in one form thereof, a method and apparatus for dynamically monitoring in real-time, the operation of a press machine during actual production orientation, with actual tooling, in order to evaluate the true interaction between actual vibration activity occurring at multiple locations within the press machine geometry. A configuration of accelerometers is used to acquire measurement data indicating the acceleration of the press machine at a plurality of press machine locations. Preferred locations in the press assembly correspond to the die stations and, specifically, to positions within the slide member and bed member in a defined "shutheight" area. An integrator converts the acceleration data into displacement data representing the displacement activity of the press machine at each of the indicated machine locations. Filtering the displacement data provides deflection measurements representing the vibrational activity (i.e., deflections) occurring at the relevant machine location. Measurements of the relative press motion activity between selected machine or tooling locations, provide a dynamic indication of the mutual influence that deflection activity occurring at respective press machine locations has on one another. The system may be a separate unit or console mounted unit operatively attached to a press machine.

The invention comprises, in another form thereof, a system for monitoring the operation of a press machine. The system includes a measurement means for providing a measurement of the press motion activity occurring at a plurality of press machine or tooling locations, and an analysis means for analyzing the relative motion activity of the press machine between any ones of the plurality of press machine locations based on the press motion activity measurements provided by the measurement means. The respective press motion activity measured at each of the press machine locations includes a representation of vibrational motion occurring thereat. The press machine operation preferably includes production activity for tooling a workpiece. Monitoring of the press machine operation, in a preferred form thereof, is performed dynamically.

The measurement means further includes, in one form thereof, a plurality of accelerometers disposed at the press machine locations and generating respective acceleration measurement signals. The analysis means further includes, in one form thereof, a motion data conversion means for converting the acceleration measurement signals generated by the plurality of accelerometers into a series of respective displacement measurement signals indicative of the displacement of the press machine at the press machine locations. Each of the displacement measurement signals is representative of the displacement activity of the press machine at a respective press machine location relative to the displacement activity at a reference position. The reference position is preferably the common bottom-dead-center portion of the press machine. The motion data conversion means includes, in one form thereof, an integrator.

The monitoring system further includes a signal conversion means for converting acceleration measurement signals provided in an analog format into a digital format representative thereof. The signal conversion means includes, in one form thereof, an analog-to-digital converter.

The analysis means further includes, in another form thereof, filtering means for filtering each one of the series of displacement measurement signals to substantially remove a respective signal component therefrom indicative of the relative translational motion of the press machine at the a specific measured location. The analysis means further includes, in yet another form thereof, a comparison means for developing relationships involving the displacement activity of the press machine associated with any ones of the plurality of press machine locations or tooling and which describe the interaction therebetween. The comparison means includes, in one form thereof, a comparator to provide a differential comparison between the respective displacement activity of the press machine at two of the press machine locations. The press machine locations preferably include positions associated with a plurality of die stations, wherein the positions associated with the die stations include locations for a slide member and a bed member associated therewith. The differential comparison provided by the comparator includes, in one form thereof, at least one of a relative measurement involving the respective displacement activity of two slide locations corresponding to respective die stations, a relative measurement involving the respective displacement activity of two bed locations corresponding to respective die stations, and a relative measurement involving the respective displacement activity of the slide member location and a bed member location corresponding to the same die station.

The relationships developed by the comparison means, in one form thereof, describe the mutual influence of displacement activity occurring at any ones of the plurality of die stations due to a cross-effect capability characterizing the displacement activity. The displacement activity associated with each of the die stations incorporates a representation of the vibrational motion occurring at the corresponding die station.

The invention comprises, in another form thereof, a system for monitoring a press operation for use with a plurality of die stations driven by a press machine including a slide member and a bed member. The system includes a slide measurement means for providing the displacement of the slide member at a respective plurality of press machine locations to generate a plurality of slide member displacement measurements representative thereof, and a bed measurement means for providing the displacement of the bed member at a respective plurality of press machine locations to generate a plurality of bed member displacement measurements representative thereof. A processor means is provided to derive relationships defining the relative motion activity of the press machine between any ones of the plurality of press machine locations based on the slide member displacement measurements and the bed member displacement measurements. The press machine locations preferably include positions associated with the plurality of die stations.

The monitoring system is characterized, in one form thereof, such that ones of the plurality of slide member displacement measurements are registered and/or timed with respective ones of the plurality of bed member displacement measurements for evaluation by the processor means of the relative motion activity between the slide member location and bed member location corresponding thereto, wherein each slide-to-bed registration is associated with a respective one of the die stations.

Each of the slide measurement means and the bed measurement means further includes, in one form thereof, a plurality of accelerometers disposed at the respective plurality of press machine locations and generating respective acceleration measurement signals representative of press machine acceleration activity occurring thereat, and an integrator means for integrating the acceleration measurement signals generated by the accelerometers to provide a respective plurality of integration signals each indicative of the displacement activity corresponding to the respective acceleration activity. Each of the slide member displacement measurements provided by the slide measurement means and each of the bed member displacement measurements provided by the bed measurement means includes, in a preferred form thereof, a respective representation of deflection activity occurring at the respective press machine location corresponding thereto.

The processor means further includes, in one form thereof, an analysis means for providing a measure of the interaction between press motion activity occurring at any ones of the plurality of press machine locations, wherein the interaction is attributable, at least in part, to the transmissibility of the respective deflection activity occurring thereat.

The analysis means includes, in one form thereof, a relative measurement means for selectively providing relative measurements including at least one of a difference measurement between slide member displacements at respective press machine locations, a difference measurement between bed member displacements at respective press machine locations, and a difference measurement between a slide member displacement and a bed member displacement at the same press machine location. The relative measurement means includes, in one form thereof, a comparator.

The monitoring system further comprises, in another form thereof, a filtering means for filtering each one of the slide member displacement measurements generated by the slide measurement means to substantially remove a respective signal component therefrom indicative of the translational motion of the press machine. The signal component indicative of press machine translational motion occupies a low frequency spectra relative to vibrational activity, which is represented in the respective slide member displacement measurement by a high frequency spectral component.

The invention comprises, in yet another form thereof, a system for monitoring the operation of a press machine, including a measurement means for providing a measurement of the press motion activity occurring at a plurality of press machine locations, and an analysis means for analyzing the interaction between respective press motion activities occurring at any ones of the plurality of press machine locations based on the press motion activity measurements provided by the measurement means.

The analysis means further comprises, in one form thereof, a comparison means, responsive to the press motion activity measurements provided by the measurements means, for developing comparative relationships involving the motion activity of the press machine associated with any ones of the plurality of press machine locations and which describe the interaction therebetween.

The measurement means further includes, in one form thereof, a plurality of accelerometers disposed at the press machine locations and generating respective acceleration measurement signals representative of press machine acceleration activity occurring thereat, and an integrator means for integrating the acceleration measurement signals generated by the accelerometers to provide a respective plurality of integration signals each indicative of the displacement activity corresponding to the respective acceleration activity. The press motion activity measured at each of the plurality of press machine locations preferably includes a representation of vibrational motion occurring thereat.

The press machine operation preferably includes production activity for tooling a workpiece. The system is characterized, in one form thereof, such that monitoring of the press machine operation is performed dynamically. The system further includes, in another form thereof, a filtering means for filtering each one of the integration signals provided by the integrator means to substantially remove a respective signal component therefrom indicative of the translational motion of the press machine.

The invention comprises, in yet another form thereof, a system for monitoring the operation of a press machine, including a measurement means for determining the acceleration of the press machine at a plurality of press machine locations, and a conversion means for converting the acceleration determined by the measurement means into a displacement measurement representative thereof and indicative of press machine motion activity occurring at the respective press machine location corresponding thereto. An evaluation means is further provided for evaluating the interrelationship of press machine motion activity between any ones of the plurality of press machine locations based on the displacement measurements provided by the conversion means.

The measurement means further includes, in one form thereof, a plurality of accelerometers. The conversion means further includes, in one form thereof, an integrator. The evaluation means further includes, in one form thereof, a comparison means for developing differential relationships involving the displacement measurements associated with any ones of the plurality of press machine locations and which describe an interaction therebetween that is due, at least in part, to the transmissibility of the respective motion activity occurring thereat. The respective press machine motion activity occurring at each of the press machine locations preferably includes a representation of deflection activity occurring thereat. The press machine operation preferably includes production activity for tooling a workpiece. The monitoring system further includes, in one form thereof, a filtering means for filtering each one of the displacement measurements provided by the conversion means to substantially remove a respective signal component therefrom indicative of the translational motion of the press machine at each location.

The invention comprises, in yet another form thereof, a system for monitoring the operation of a press machine, including a plurality of accelerometers each disposed at a respective one of a plurality of press machine locations and generating a respective acceleration measurement signal representative of press machine acceleration activity occurring thereat, and an integrator means for integrating the acceleration measurement signals generated by the accelerometers to provide a respective plurality of integration signals each indicative of the displacement activity corresponding to the respective acceleration activity. An analysis means is for analyzing the relative motion activity of the press machine between any ones of the plurality of press machine locations based on the displacement-indicating integration signals provided by the integrator means. The analysis means further includes, in one form thereof, a means, operatively coupled to the integrator means, for developing comparative relationships involving the displacement activity indicated by the plurality of integration signals.

The press machine operation preferably includes production activity for tooling a workpiece. The monitoring system is characterized, in one form thereof, such that the displacement activity indicated by each one of the integration signals and associated with a respective one of the press machine locations includes a representation of vibrational motion occurring thereat.

The invention comprises, in yet another form thereof, a method of monitoring the operation of a press machine, including the steps of measuring the press motion activity occurring at a plurality of press machine locations, and analyzing the relative motion activity of the press machine between any ones of the plurality of press machine locations based on the press motion activity measurements associated therewith.

The measuring step, in one form thereof, further includes the steps of determining the acceleration of the press machine at the plurality of press machine locations, and converting the acceleration of the press machine determined at the plurality of press machine locations into a respective displacement measurement representative of the displacement activity of the press machine corresponding to the acceleration. The acceleration determination step further includes, in one form thereof, the step of providing a plurality of accelerometers disposed at the plurality of press machine locations. The analyzing step further includes, in one form thereof, the step of comparing the displacement activity of the press machine between any ones of the plurality of press machine locations. The displacement activity associated with each one of the press machine locations preferably includes a representation of vibrational motion occurring thereat. The press machine operation preferably includes production activity for tooling a workpiece.

One advantage of the present invention is that the vibrational activity of the press operation can be monitored during actual die load conditions involving the manufacturing of a workpiece.

Another advantage of the present invention is that the press operation can be monitored continuously (i.e., dynamically) in real-time so that the measured data, such as acceleration and displacement measurements, reflect actual press characteristics currently developed within the press machine.

Yet another advantage of the present invention is that the monitoring system evaluates measurement data produced as a result of actual die load conditions and acquired from press machine locations where actual workpiece-related loads are being developed.

Yet another advantage of the present invention is that the monitoring system provides a means for dynamically evaluating the interaction between individually measured deflection activities occurring at any of the press machine locations.

Still yet another advantage of the present invention is that the monitoring system allows for the complete definition of any and all deflection activity occurring at any die station and correlated to a matrix of independent die production conditions.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
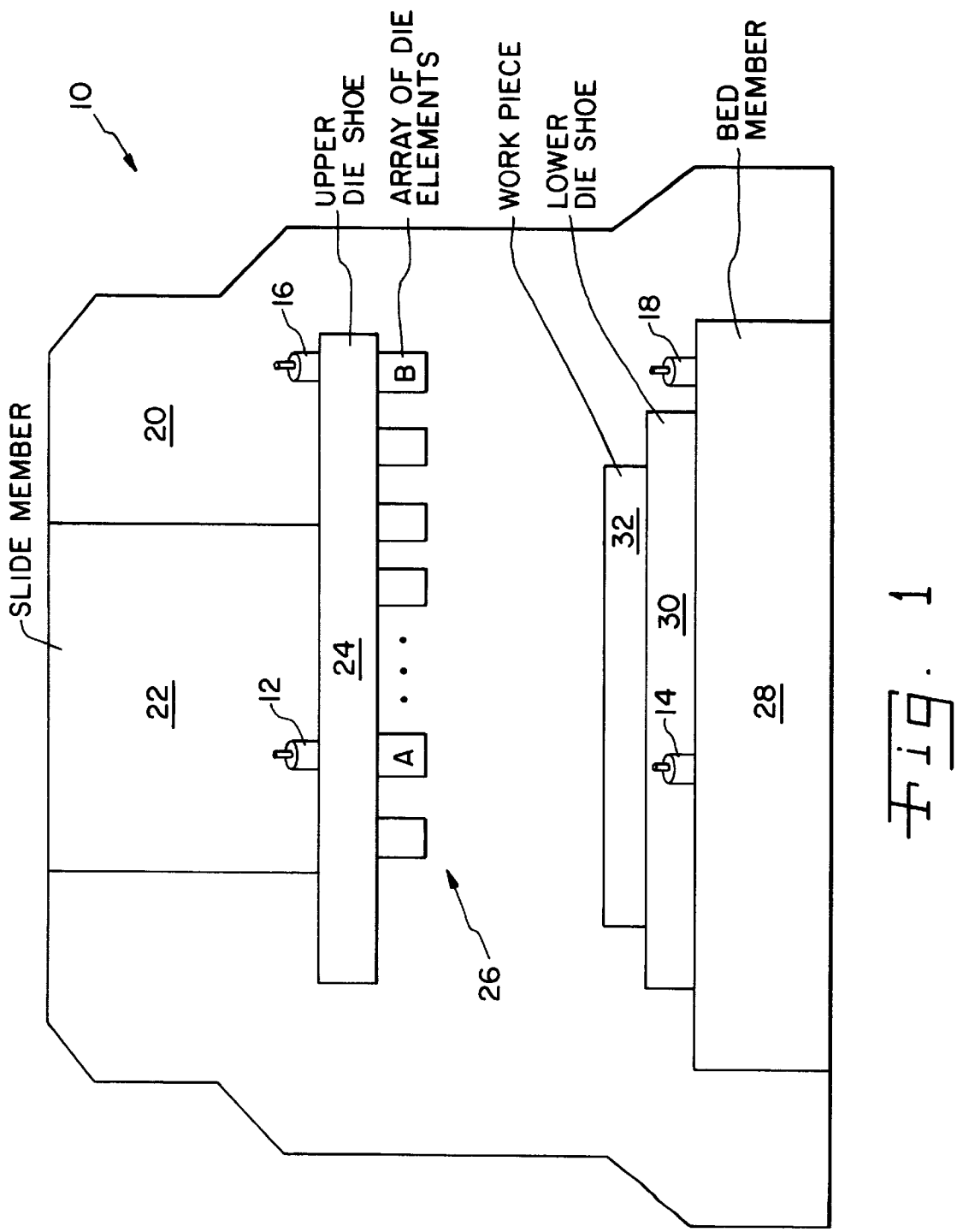
FIG. 1 is a schematic front elevational view of a representative press assembly configured with an illustrative arrangement of accelerometers for use in the monitoring system according to the present invention.

Corresponding reference characters indicate corresponding parts throughout the several views. The exemplification set forth herein illustrates one preferred embodiment of the invention, in one form thereof, and such exemplification is not to be construed as limiting the scope of the invention in any manner.

DETAILED DESCRIPTION OF THE INVENTION

Referring to FIG. 1, there is shown a schematic front elevational view of a representative press assembly 10 configured with an illustrative arrangement of accelerometers shown schematically at 12, 14, 16, and 18 for use in the monitoring system according to the present invention. Press assembly 10 is of conventional construction known to those skilled in the art and includes press machine 20 having a slide or ram member 22, upper die shoe 24 configured with an array of die elements shown collectively at 26, bed member 28, and lower die shoe 30 disposed thereon and securably supporting workpiece 32. During operation, slide 22 moves downward so that certain die elements within array 26, which are appropriate to the production process currently running, engage workpiece 32 and produce the intended tooling formation.

The particular architecture of press assembly 10 used in conjunction with the monitoring system disclosed herein does not form a part of the present invention and can encompass any arrangement. The registration of a discrete die element of array 26 with a corresponding portion of lower die shoe 30 constitutes a die station; accordingly, there is illustrated in FIG. 1 a plurality of die stations, with two such die stations being labeled A and B for explanatory purposes. Station B is considered non-active since it is positioned in the illustrated manner not to engage workpiece 32 during the press stroke.

Figure 2:
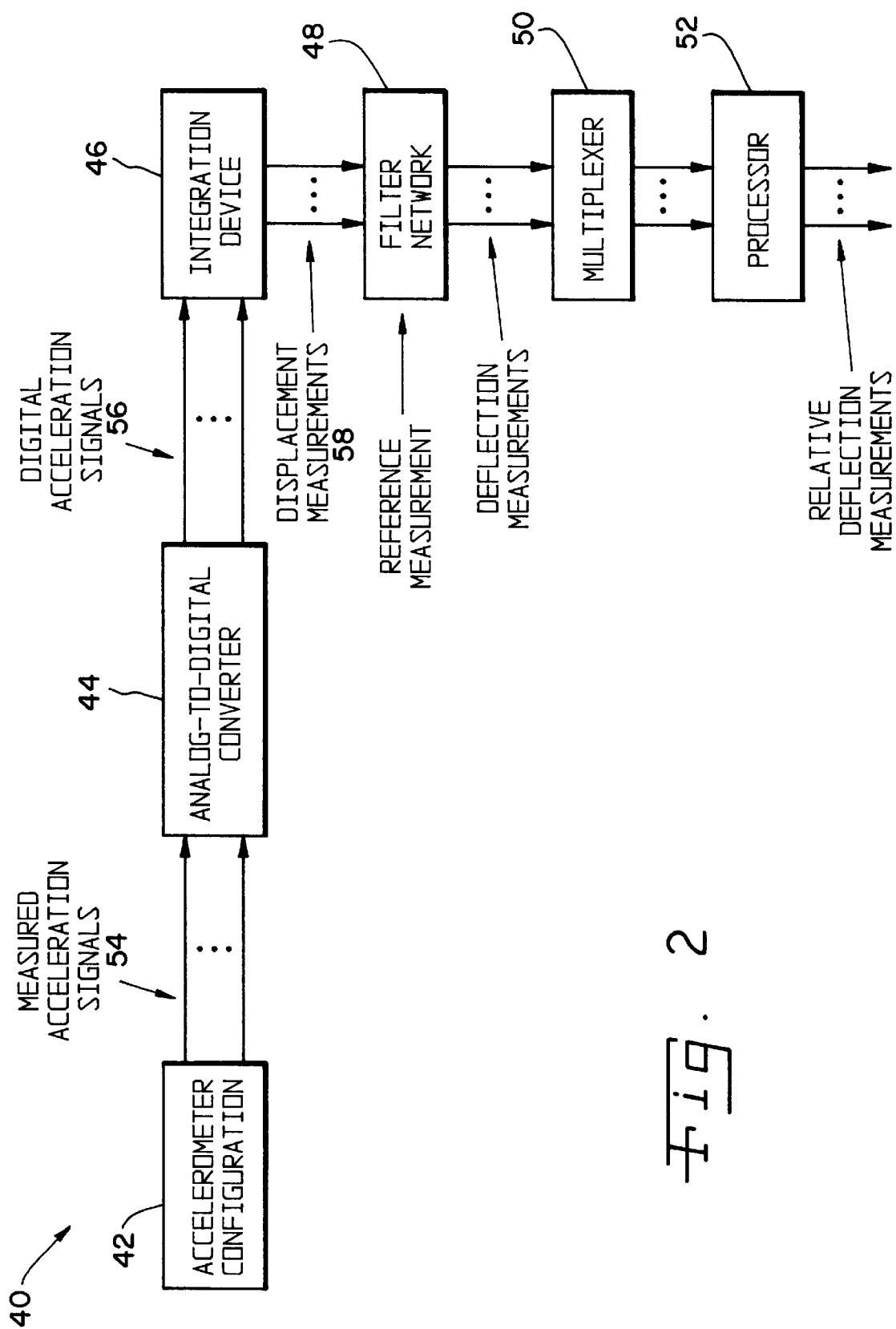
FIG. 2 is a block diagram illustration of a monitoring system adapted for use with the press assembly shown in FIG. 1, in accordance with one embodiment of the present invention.

Referring to FIG. 2, there is shown a block diagram illustration of a monitoring system 40 adapted for use with the press assembly 10 shown in FIG. 1, in accordance with one embodiment of the present invention. Monitoring system 40 broadly functions to dynamically monitor the operation of press assembly 10 in real-time during an actual production process, and more particularly functions to monitor and identify the deflection activity that occurs throughout press machine 20. It is appropriate before proceeding with a detailed description of the components of FIG. 2 to discuss the origin and effect of vibration activity within the press structure. As used herein, deflection and vibration activity will be used interchangeably.

There has been recognized in connection with the present invention disclosed herein a phenomenon involving cross-loading effects that is characterized by the extra-territorial transmission of load-induced deflection activity from its region of initial occurrence (i.e., point of origin) to other locations within the press machine geometry. In acoustic terms, the deflection activity acts as a shock wave by overcoming any internal structural resistance that attempts to restrain its impact to a localized area surrounding its origin, instead spreading out and propagating to other surrounding regions. The existence of such a phenomenon in a press machine having multiple die stations in simultaneous or near-simultaneous operation means that the load conditions at each die station will influence the press activity occurring at other die stations due to the propagation of the induced vibrational activity beyond the boundaries defined by the construction of its corresponding die station. The effect of the vibrations is therefore not limited to the apparatus (i.e., die station) that is responsible for initially introducing the vibration energy into the press structure. Rather, this vibrational activity will interact with load-induced vibrations generated at other press machine locations and affect the actual effective deflection activity that is measured at these locations. It is a principal aspect of the present invention to provide a measurement that incorporates a representation of the cross-loading effect and which facilitates an evaluation of the interaction between deflection activities occurring at any ones of a plurality of press machine locations.

Referring specifically to FIG. 2, monitoring system 40 includes an accelerometer configuration 42, an analog-to-digital converter 44, an integration device 46, a filter network 48, a multiplexer 50, and a processor 52. Accelerometer configuration 42 includes a plurality of discrete accelerometer units each disposed at a respective one of a plurality of press machine locations where deflection measurement data is to be collected. The accelerometer, or any other suitable sensing device having comparable operability, provides a measure of the acceleration of the structure to which it is engaged in acceleration-sensing relationship. Although the accelerometers may be placed anywhere within press machine 20, a preferred distribution would position the accelerometers within the die stations, preferably with one accelerometer secured to the slide member and another secured to the bed member. In particular, the accelerometers are suitably disposed within the die stations to measure as accurately as possible the actual deflection due to the load developed within the station. The accelerometer configuration 42 generates a series of acceleration signals 54 each representative of the acceleration sensed by a respective one of the accelerometers, and forwards these signals to analog-to-digital (A/D) converter 44 where the measured acceleration signals 54 are converted from their analog format into a digital version representative thereof. Due to the dynamic operation of the monitoring system, the acceleration data is continuously supplied to form a time series thereof. Accordingly, all signals and measurements derived therefrom will likewise take the form of a time series.

Integration device 46 receives the digital acceleration signals 56 provided by A/D converter 44 and performs a double integration operation on each signal that first converts it into a velocity signal and then a displacement signal. The result is a series of displacement measurements 58 provided by integration device 46 that represent the displacement activity occurring at the array of press machine locations where the original acceleration measurements were obtained.

The displacement measurements 58 provided by integration device 46 describe the displacement activity of the press machine components associated therewith (i.e., the respective press structure to which the corresponding accelerometer is attached). Accordingly, with respect to those accelerometers positioned within the slide member of press machine 20, the displacement measurements generated therefrom include a representation of the intended translational (i.e., vertical) motion designed to produce the force applied to workpiece 32, and a representation of the vibrational activity induced in the press structure (die station) by the developing load. Filter network 48 is provided for the purpose of isolating the spectral component representing the vibration activity by filtering out the spectral component representing the vertical motion of the press slide. The frequency signal corresponding to the vertical motion of the slide occupies a generally lower bandwidth than the relatively higher frequency signal representing the vibration; accordingly, filter network 48 preferably performs a high-pass filtering function. Filtering of displacement measurement signals derived from relatively stationary press components such as the bed member is optional since there is generally not present therein any low frequency signal representative of translational motion.

A reference measurement signal is applied to filter network 48 so that the displacement measurement indicated by the filtered high frequency signal is referenced to a baseline value. This reference signal is preferably provided by a displacement measurement derived from the common bottom-dead-center (BDC) location of press machine 20. The output from filter network 48 therefore corresponds to a series of deflection measurements referenced to common BDC. The deflection measurement is representative of the vibrational activity attributable to the load conditions developed within its respective press machine location and, more importantly, to contributions received from deflection activity occurring at other press machine locations and which are sufficient in strength and propagating direction to interact with and influence the existing, locally-developed vibration activity.

Figure 3:
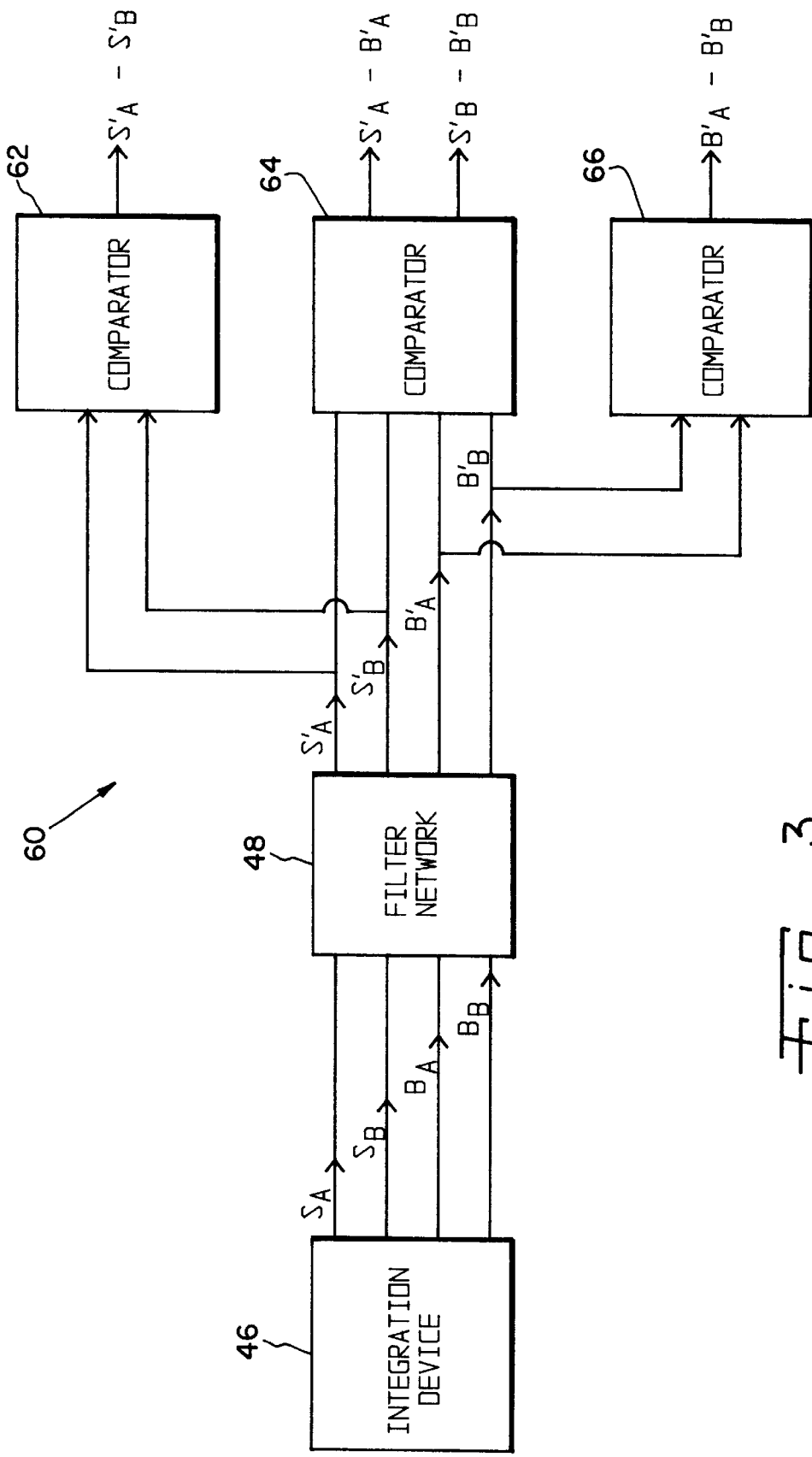
FIG. 3 is a block diagram view, in part, of the monitoring system shown in FIG. 2 to illustrate the relative deflection measurement facility of the present invention, using a pair of slide measurements and bed measurements acquired from two separate die station locations.
Figure 4A:
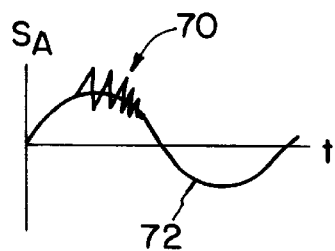
FIGS. 4A–D are a series of graphic plots illustrating a representative set of dynamic displacement signals corresponding to the measurements disclosed in FIG. 3.
Figure 5A:
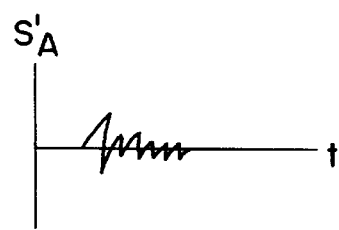
FIGS. 5A–D are a series of graphic plots illustrating a filtered version of each of the dynamic displacement signals shown in FIGS. 4A–D.
Figure 4B:
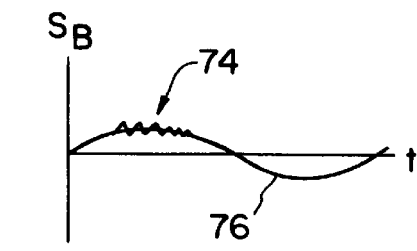
Figure 5B:
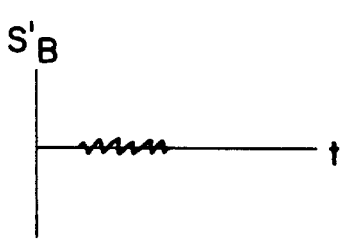
Figure 4C:
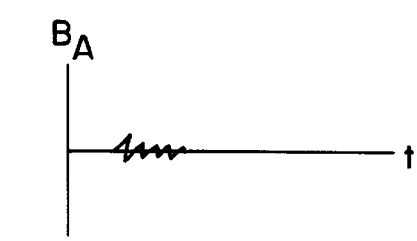
Figure 5C:
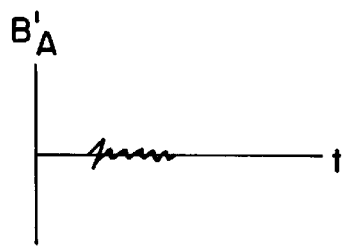
Figure 4D:
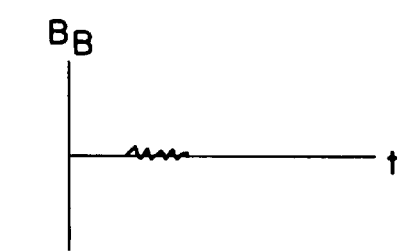
Figure 5D:
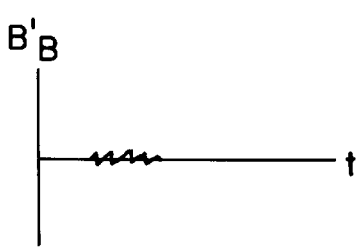
Figure 6A:
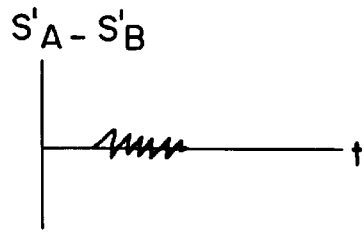
FIGS. 6A–D are a series of graphic plots illustrating a set of relative deflection measurements based on the filtered displacements signals shown in FIGS. 5A–D.
Figure 6B:
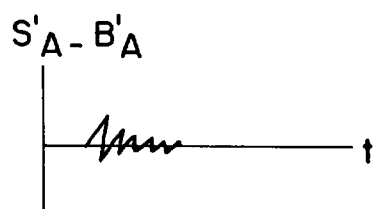
Figure 6C:
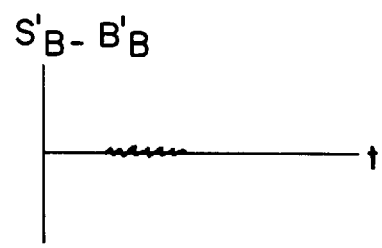
Figure 6D:
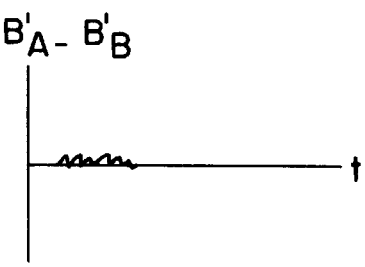

Monitoring system 40 provides a mechanism for examining the nature and extent of this interaction by analyzing the relative motion activity of the press machine between any ones of the plurality of press machine locations based on the deflection measurements provided by filter network 48. Processor 52 functions to derive relationships defining the relative motion activity of the press machine between any ones of the plurality of press machine locations. These relationships are developed using a comparator device integrated into processor 52, which selectively provides a differential comparison between the deflection measurements corresponding to any ones of the press machine locations. The selectivity is implemented using a controllable multiplexer 50 that receives the deflection measurements at an input port, and outputs selected ones of the deflection measurements at an output port according to a user-provided variable key that is indexed to the press machine locations. In effect, the multiplexer makes available the selection of any set of inputs (deflection data) as indexed by location to develop a relationship among them. In other embodiments, the measurements may also be compared substantially simultaneously, if computerized equipment with sufficient capacity is utilized. The differential comparison performed by the comparator device preferably includes at least one of a relative measurement involving the respective displacement activity of two slide members corresponding to respective die stations, a relative measurement involving the respective displacement activity of two bed members corresponding to respective die stations, and a relative measurement involving the respective displacement activity of a slide member and a bed member corresponding to the same die station. FIG. 3 provides an illustration of how this aforementioned series of relative measurements would be implemented according to the present invention.

Although processor 52 has been described herein as providing a differential comparison, this particular operating mode should not be construed as a limiting feature of monitoring system 40 since processor 52 encompasses any form of signal processing suitable for analyzing the relative motion activity between press machine locations, in accordance with the present invention. Processor 52 should be broadly construed as providing any type of signal conditioning that establishes or attempts to establish relationships among the acceleration measurements (and signals derived therefrom) that facilitate an understanding of how press machine motion activity (and deflection activity in particular), occurring at various locations throughout the press assembly, interact with and/or influence each other. Illustrative embodiments of processor 52 include any appropriate signal conditioner, processor or other comparable configuration, or any combination thereof; additionally, the conditioning operation may be executed in software. The processor 52 may include auxiliary circuitry to capture and evaluate (in detail) acceleration or displacement signals at a later time.

Referring to FIG. 3, there is shown a block diagram illustrating, in part, monitoring system 40 of FIG. 2 to provide an illustration of the operation of the comparator device contained within processor 52. In particular, what is hereby disclosed is a representative circuit configuration 60 for determining the relative deflection activity occurring between two separate press machine locations each positioned within a respective die station. The arrangement of accelerometers in FIG. 1 is suitable for providing the acceleration measurement signals used by the circuit configuration of FIG. 3, wherein the indicated variables are defined as follows: $S_A$ represents the displacement measurement of the slide at location A (i.e., within die station A) ; $S_B$ represents the displacement measurement of the slide at location B (i.e., within die station B); $B_A$ represents the displacement measurement of the bed at location A; and $B_B$ represents the displacement measurement of the bed at location B. Furthermore, as a result of filtering, there is provided the following signals: $S_A'$ represents the deflection of the slide at location A; $S_B'$ represents the deflection of the slide at location B; $B_A'$ represents the deflection of the bed at location A; and $B_B'$ represents the deflection of the bed at location B. Circuit configuration 60 includes a bank of comparators performing the indicated input-output differential computation. In particular, comparator 62 provides a relative slide deflection measurement $(S_A'-S_B')$ representing the relative deflection of the slide between stations A and B; comparator 66 provides a relative bed deflection measurement $(B_A'-B_B')$ representing the relative deflection of the bed between stations A and B; and comparator 64 provides a pair of slide-to-bed relative deflection measurements ($S_A'-B_A'$ and $S_B'-B_B'$) representing the relative deflection of the slide to the bed within the same stations A and B, respectively.

Referring to FIGS. 4–6, there is shown a series of graphic plots depicting one illustrative example of the signals indicated in FIG. 3. In particular, FIGS. 4A–D are a series of graphic plots illustrating a representative set of dynamic displacement signals. FIGS. 5A–D are a series of graphic plots illustrating a filtered version of each of the dynamic displacement signals shown in FIGS. 4A–D. FIGS. 6A–D are a series of graphic plots illustrating a set of relative deflection measurements based on the filtered displacements signals shown in FIGS. 5A–D. Referring to FIG. 4A, there is illustrated the spectral composition of the unfiltered displacement measurement slide signal $S_A$ (i.e., the signal provided by integration device 46), namely a high frequency component 70 (representative of the deflection activity) superimposed on a low frequency component 72 (corresponding to the press vertical motion). A similar combination of high and low frequency components 74 and 76, respectively, is illustrated in FIG. 4B for a slide signal $S_B$. FIGS. 5A and 5B indicate how the filtering operation removes the low frequency signal and leaves only the high frequency spectra. Such relative deflection measurements are useful in determining the existence, if any, of any interaction between deflection activity occurring at certain machine locations. This interaction is particularly important when multiple die stations are in operation. For example, if an evaluation of the measurement data reveals a high level of relative deflection activity between certain die stations, this would likely be interpreted as an indication that the output quality of the part being produced at one of the stations is being adversely affected by the load conditions at the other stations because undesirable levels of deflection activity (as so measured) are being introduced into the part production station due to load conditions external to the station.

The monitoring system of the present invention offers several important advantages distinguishing it from conventional monitoring apparatus. The multi-positional acceleration measurements are obtained simultaneously and processed in parallel immediately, providing an instantaneous profile describing the motion characteristics of the entire press machine in real-time. The measurement data generated by the monitoring system takes into account the fact that there is multiple loading occurring at multiple stations, and that loading occurring at each station could, in fact, have an influence on deflection activity at all or other ones of the die stations. The monitoring system is further characterized in that the monitoring is performed dynamically and during an actual workpiece production program, providing a measure of the actual deflections that occurred over the time period of interest (e.g., the entire press stroke) due to actual impact (i.e., loading) conditions. The measurement data has a characteristic robustness in that it incorporates a variety of significant conditions and effects occurring within the press machine during parts production. For example, the measurement data includes representations of the compressive and tensile effects from actual loads; all non-die station effects (e.g., loads from stripper plates, counter balance cylinders, or any other device within the tooling); and all inter-station cross-loading effects. The dynamic nature of the monitoring operation further allows the evaluation of slide-to-bed deflection conditions at any point in the stroke (or between any other machine locations), permitting a thorough examination of the production process to assure its integrity. An evaluation based on deflection measurements pertaining to machine locations distributed throughout the press assembly facilitate the identification of die stations where excessive levels of vibration disturbance are being generated. The dynamic deflection data is preferably correlated to the underlying production process to generate a profile of process-dependent deflection conditions indexed to respective die station locations.

In an alternative embodiment, the monitoring system can be used to determine the mode of operation of the press machine based on the acceleration measurement data. The time-dependent acceleration data would be combined with associated position data to create a model illustrating how the press machine is deflecting as it goes through its press stroke. Such a model would be useful in the event that the most accurate positioning of the accelerometer is not possible, since a configuration of proximately-disposed accelerometers can be used to develop acceleration data that simulates the actual acceleration value. The simulation could employ weighted averaging of the measurement data, wherein the weight is proportional to the nearness of the accelerometer to the actual die station site.

The components and subsystems indicated in the embodiments disclosed herein are for illustrative purposes only, as it should be apparent to those skilled in the art that other devices and structures may be substituted therefor to achieve equivalent functionality. Processor 52 may be implemented in any conventional manner employing microprocessor circuitry, a hardwired configuration, and/or software modules. Components 42-44-46-48-50-52 preferably form an integrated unit adapted for coupling to any array of accelerometers used in conjunction with any type of press machine 20, thereby providing a general suitability for a wide range of portable applications.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for monitoring the operation of a press machine, comprising:

measurement means for providing a measurement of the press motion activity occurring at a plurality of press machine locations; and analysis means for analyzing and comparing the relative motion activity of the press machine between any ones of said plurality of press machine locations based on the press motion activity measurements provided by said measurement means;

said analysis means including comparison means for providing a differential comparison between the respective displacement activity at at least two of said press machine locations.

2. The system as recited in claim 1, wherein the respective press motion activity measured at each of said plurality of press machine locations includes a representation of vibrational motion occurring thereat.

3. The system as recited in claim 1, wherein the press machine operation includes production activity for tooling a workpiece.

4. The system as recited in claim 1, wherein monitoring of the press machine operation is performed dynamically.

5. The system as recited in claim 1, wherein said measurement means further comprises:
   a plurality of accelerometers disposed at said plurality of press machine locations and generating respective acceleration measurement signals.

6. The system as recited in claim 5, wherein said analysis means further comprises:
   motion data conversion means for converting the acceleration measurement signals generated by said plurality of accelerometers into a series of respective displacement measurement signals indicative of the displacement of the press machine at said plurality of press machine locations.

7. The system as recited in claim 6, wherein each of the displacement measurement signals in said series thereof is representative of the displacement activity of the press machine at a respective press machine location relative to the displacement activity at a reference position.

8. The system as recited in claim 7, wherein the reference position is common bottom-dead-center of the press machine.

9. The system as recited in claim 6, wherein said motion data conversion means includes:
   an integrator.

10. The system as recited in claim 6, further comprises:
    signal conversion means for converting acceleration measurement signals provided in an analog format into a digital format representative thereof.

11. The system as recited in claim 10, wherein said signal conversion means includes:
    an analog-to-digital converter.

12. The system as recited in claim 6, wherein said analysis means further comprises:
    filtering means for filtering each one of the series of displacement measurement signals to substantially remove a respective signal component therefrom indicative of the translational motion of the press machine.

13. The system as recited in claim 6, wherein said plurality of press machine locations includes positions associated with a plurality of die stations.

14. The system as recited in claim 13, wherein the positions associated with said plurality of die stations include locations for a slide member and a bed member associated therewith.

15. The system as recited in claim 14, wherein the differential comparison provided by a comparator includes at least one of a relative measurement involving the respective displacement activity of two slide members corresponding to respective die stations, a relative measurement involving the respective displacement activity of two bed members corresponding to respective die stations, and a relative measurement involving the respective displacement activity of a slide member and a bed member corresponding to the same die station.

16. The system as recited in claim 6, wherein said plurality of press machine locations includes positions associated with a plurality of die stations.

17. The system as recited in claim 16, wherein the relationships developed by said comparison means describe the mutual influence of displacement activity occurring at any ones of said plurality of die stations due to a cross-effect capability characterizing the displacement activity.

18. The system as recited in claim 17, wherein the respective displacement activity associated with each of said plurality of die stations incorporates a representation of the vibrational motion occurring at the corresponding die station.

19. A system for monitoring a press operation for use with a plurality of die stations driven by a press machine including a slide member and a bed member, said system comprising:
   slide measurement means for providing the displacement of the slide member at a respective plurality of press machine locations to generate a plurality of slide member displacement measurements representative thereof;
   bed measurement means for providing the displacement of the bed member at a respective plurality of press machine locations to generate a plurality of bed member displacement measurements representative thereof; and
   processor means for deriving relationships defining the relative motion activity of the press machine between any ones of said plurality of press machine locations based on the slide member displacement measurements and the bed member displacement measurements.

20. The system as recited in claim 19, wherein said plurality of press machine locations includes positions associated with said plurality of die stations.

21. The system as recited in claim 20, wherein ones of said plurality of slide member displacement measurements are registered with respective ones of said plurality of bed member displacement measurements for evaluation by said processor means of the relative motion activity between the slide member location and bed member location corresponding thereto, wherein each slide-to-bed registration is associated with a respective one of the plurality of die stations.

22. The system as recited in claim 19, wherein each of said slide measurement means and said bed measurement means further comprises:
   a plurality of accelerometers disposed at said respective plurality of press machine locations and generating respective acceleration measurement signals representative of press machine acceleration activity occurring thereat; and
   integrator means for integrating the acceleration measurement signals generated by said plurality of accelerometers to provide a respective plurality of integration signals each indicative of the displacement activity corresponding to the respective acceleration activity.

23. The system as recited in claim 22, wherein each of the plurality of slide member displacement measurements provided by said slide measurement means and each of the plurality of bed member displacement measurements provided by said bed measurement means includes a respective representation of deflection activity occurring at the respective press machine location corresponding thereto.

24. The system as recited in claim 23, wherein said processor means further comprises:
   analysis means for providing a measure of the interaction between press motion activity occurring at any ones of said plurality of press machine locations, wherein said interaction is attributable, at least in part, to the transmissibility of the respective deflection activity occurring thereat.

25. The system as recited in claim 24, wherein said analysis means includes:
   relative measurement means for selectively providing relative measurements including at least one of a difference measurement between slide member displacements at respective press machine locations, a difference measurement between bed member displacements at respective press machine locations, and a difference measurement between a slide member displacement and a bed member displacement at the same press machine location.

26. The system as recited in claim 25, wherein said relative measurement means includes:
a comparator.

27. The system as recited in claim 22, further comprises:
filtering means for filtering each one of said slide member displacement measurements generated by said slide measurement means to substantially remove a respective signal component therefrom indicative of the translational motion of the press machine.

28. The system as recited in claim 27, wherein the signal component indicative of press machine translational motion occupies a low frequency spectra relative to vibrational activity, which is represented in the respective slide member displacement measurement by a high frequency spectral component.

29. A system for monitoring the operation of a press machine, comprising:
measurement means for providing a measurement of the press motion activity occurring at a plurality of press machine locations; and
analysis means for analyzing the interaction between respective press motion activities occurring at any ones of said plurality of press machine locations based on the press motion activity measurements provided by said measurement means;
said analysis means including comparison means for providing a differential comparison between the respective displacement activity at at least two of said press machine locations.

30. The system as recited in claim 29, wherein said comparison means is responsive to the press motion activity measurements provided by said measurements means, for developing comparative relationships involving the motion activity of the press machine associated with any ones of said plurality of press machine locations and which describe the interaction therebetween.

31. The system as recited in claim 30, wherein said measurement means further comprises:
a plurality of accelerometers disposed at said plurality of press machine locations and generating respective acceleration measurement signals representative of press machine acceleration activity occurring thereat; and
integrator means for integrating the acceleration measurement signals generated by said plurality of accelerometers to provide a respective plurality of integration signals each indicative of the displacement activity corresponding to the respective acceleration activity.

32. The system as recited in claim 31, wherein the press machine operation includes production activity for tooling a workpiece.

33. The system as recited in claim 32, wherein the respective press motion activity measured at each of said plurality of press machine locations includes a representation of vibrational motion occurring thereat.

34. The system as recited in claim 33, wherein monitoring of the press machine operation is performed dynamically.

35. The system as recited in claim 31, further comprises:
filtering means for filtering each one of the integration signals provided by said integrator means to substantially remove a respective signal component therefrom indicative of the translational motion of the press machine.

36. A system for monitoring the operation of a press machine, comprising:
measurement means for determining the acceleration of the press machine at a plurality of press machine locations;
conversion means for converting the acceleration determined by said measurement means into a displacement measurement representative thereof and indicative of press machine motion activity occurring at the respective press machine location corresponding thereto; and
evaluation means for evaluating the interrelationship of press machine motion activity between any ones of said plurality of press machine locations based on the displacement measurements provided by said conversion means.

37. The system as recited in claim 36, wherein said measurement means further comprises:
a plurality of accelerometers.

38. The system as recited in claim 37, wherein said conversion means further comprises:
an integrator.

39. The system as recited in claim 36, wherein said evaluation means further comprises:
comparison means for developing differential relationships involving the displacement measurements associated with any ones of said plurality of press machine locations and which describe an interaction therebetween that is due, at least in part, to the transmissibility of the respective motion activity occurring thereat.

40. The system as recited in claim 39, wherein the respective press machine motion activity occurring at each of said plurality of press machine locations includes a representation of deflection activity occurring thereat.

41. The system as recited in claim 40, wherein the press machine operation includes production activity for tooling a workpiece.

42. The system as recited in claim 36, further comprises:
filtering means for filtering each one of said displacement measurements provided by said conversion means to substantially remove a respective signal component therefrom indicative of the translational motion of the press machine.

43. A system for monitoring the operation of a press machine, comprising:
a plurality of accelerometers each disposed at a respective one of a plurality of press machine locations and generating a respective acceleration measurement signal representative of press machine acceleration activity occurring thereat;
integrator means for integrating the acceleration measurement signals generated by said plurality of accelerometers to provide a respective plurality of integration signals each indicative of the displacement activity corresponding to the respective acceleration activity; and
analysis means for analyzing the relative motion activity of the press machine between any ones of said plurality of press machine locations based on the displacement-indicating integration signals provided by said integrator means.

44. The system as recited in claim 43, wherein said analysis means further comprises:
means, operatively coupled to said integrator means, for developing comparative relationships involving the displacement activity indicated by said plurality of integration signals.

45. The system as recited in claim 44, wherein the press machine operation includes production activity for tooling a workpiece.

46. The system as recited in claim 45, wherein the displacement activity indicated by each one of said plurality of integration signals and associated with a respective one of said plurality of press machine locations includes a representation of vibrational motion occurring thereat.

47. A method of monitoring the operation of a press machine, comprising the steps of:

measuring the press motion activity occurring at a plurality of press machine locations; and analyzing and comparing the relative motion activity of the press machine between any ones of said plurality of press machine locations based on the press motion activity measurements associated therewith; and including comparison means for providing a differential comparison between the respective displacement activity at at least two of said press machine locations.

48. The method as recited in claim 47, wherein the measuring step further includes the steps of:

determining the acceleration of the press machine at said plurality of press machine locations; and converting the acceleration of the press machine determined at said plurality of press machine locations into a respective displacement measurement representative of the displacement activity of the press machine corresponding to said acceleration.

49. The method as recited in claim 48, wherein the acceleration determination step further includes the step of:

providing a plurality of accelerometers disposed at said plurality of press machine locations.

50. The method as recited in claim 48, wherein the displacement activity associated with each one of said plurality of press machine locations includes a representation of vibrational motion occurring thereat.

51. The method as recited in claim 50, wherein the press machine operation includes production activity for tooling a workpiece.

* * * * *